(12) United States Patent
Tanaka et al.

(10) Patent No.: US 12,473,947 B2
(45) Date of Patent: Nov. 18, 2025

(54) LINEAR MOTION GUIDE UNIT

(71) Applicant: NIPPON THOMPSON CO., LTD., Tokyo (JP)

(72) Inventors: Toshimichi Tanaka, Mino (JP); Tamotsu Iwata, Mino (JP); Kazuki Yamada, Mino (JP); Yasuhiro Otsuji, Mino (JP); Shunya Yamazaki, Mino (JP)

(73) Assignee: NIPPON THOMPSON CO., LTD., Tokyo (JP)

( * ) Notice: Subject to any disclaimer, the term of this patent is extended or adjusted under 35 U.S.C. 154(b) by 76 days.

(21) Appl. No.: 18/566,783

(22) PCT Filed: Mar. 23, 2022

(86) PCT No.: PCT/JP2022/013575
§ 371 (c)(1),
(2) Date: Dec. 4, 2023

(87) PCT Pub. No.: WO2022/264598
PCT Pub. Date: Dec. 22, 2022

(65) Prior Publication Data
US 2024/0271660 A1 Aug. 15, 2024

(30) Foreign Application Priority Data
Jun. 16, 2021 (JP) ................................. 2021-100500

(51) Int. Cl.
*F16C 29/06* (2006.01)
(52) U.S. Cl.
CPC ...... *F16C 29/0657* (2013.01); *F16C 29/0609* (2013.01)

(58) Field of Classification Search
CPC .. F16C 29/06; F16C 29/0657; F16C 29/0609; F16C 29/0602; F16C 29/0604
See application file for complete search history.

(56) References Cited

U.S. PATENT DOCUMENTS

| 5,362,156 A * | 11/1994 | Hara ........................ F16C 29/12 384/49 |
| 2005/0213856 A1* | 9/2005 | Geka ..................... F16C 29/064 384/45 |
| 2009/0268994 A1 | 10/2009 | Kawashima |

FOREIGN PATENT DOCUMENTS

| JP | H02-053518 U | | 4/1990 |
| JP | H 0253518 U | * | 4/1990 |

(Continued)

*Primary Examiner* — James Pilkington
*Assistant Examiner* — Aimee Tran Nguyen
(74) *Attorney, Agent, or Firm* — Oliff PLC

(57) ABSTRACT

In a linear motion guide unit, a raceway groove formed in a casing of a slider includes a first raceway surface extending along the length direction of the slider and a second raceway surface facing the first raceway surface and extending along the length direction of the slider. The second raceway surface includes a first portion including a center portion in a length direction of the casing, and a second portion including end portions in the length direction of the casing and having a wall surface shape different from a wall surface shape of the first portion. In the first portion, the first raceway surface and the second raceway surface define a symmetric Gothic arch groove, and in the second portion, the second raceway surface has a surface recessed from a position symmetric to the first raceway surface.

5 Claims, 8 Drawing Sheets

(56) References Cited

FOREIGN PATENT DOCUMENTS

| | | | |
|---|---|---|---|
| JP | H03-040035 U | | 4/1991 |
| JP | 2004052792 A | * | 2/2004 |
| JP | 3964926 B2 | | 8/2007 |

* cited by examiner

LINEAR MOTION GUIDE UNIT

TECHNICAL FIELD

The present invention relates to a linear motion guide unit. This application claims priority to Japanese Patent Application No. 2021-100500, which was filed on Jun. 16, 2021, and is incorporated herein by reference in its entirety.

BACKGROUND ART

In a linear motion guide unit, each of a rail and a slider has a rolling groove, and a rolling element rolls on a path formed by the rolling groove on the rail and the rolling groove on the slider that are opposed to each other. A shape of a wall surface constituting a rolling groove has been investigated. Patent Literature 1, for example, describes Gothic arch grooves formed on a slider and having different wall surface shapes between a center portion and end portions in the axial direction. In a linear motion guide unit of Patent Literature 1, in the center portion of the slider, both upper and lower raceway surfaces of the Gothic arch grooves are ball rolling surfaces that are to contact balls. On the other hand, in the end portions of the slider, vertexes of the Gothic arch grooves of the slider are offset from vertexes of the rolling grooves of the rail such that balls contact only one of the upper and lower raceway surfaces.

Patent Literature 2 describes a linear motion guide unit in which the shape of a wall surface constituting a turnaround path formed in an end cap of a slider is designed to change continuously. Specifically, the contact angle as a wall surface of a circular cross section is 0° in an approaching portion of the turnaround path, the contact angle with an outer peripheral wall surface is 60° in a center portion of the turnaround path, and the contact angle is 45° near an outlet of the turnaround path.

CITATION LIST

Patent Literatures

Patent Literature 1: Japanese Unexamined Utility Model Registration Application Publication No. H02-53518
Patent Literature 2: Japanese Patent No. 3964926

SUMMARY OF INVENTION

Technical Problem

A linear motion guide unit is used in various installation modes. In some orientations of installation, however, failures easily occur in sliding. It is therefore an object of the present invention to provide a linear motion guide unit that suppresses occurrence of failures in sliding even in lateral installation of the linear motion guide unit irrespective of installation modes of the linear motion guide unit.

Solution to Problems

A linear motion guide unit according to the present disclosure includes: a rail including a pair of first raceway grooves extending in parallel along a longitudinal direction; a slider straddling the rail such that the slider is movable relative to the rail, the slider including a pair of second raceway grooves respectively facing the pair of first raceway grooves; and a plurality of rolling elements, and the rail and the slider define an annular path in which the plurality of rolling elements circulate. In the linear motion guide unit, the annular path includes a raceway path defined by the first raceway groove and the second raceway groove, a first circulation path defined in the slider and extending side by side with the raceway path, and two second circulation paths defined in the slider and connecting the raceway path and the first circulation path to each other. In the linear motion guide unit, the second raceway grooves of the slider are defined in a casing of the slider. Each of the second raceway grooves includes a first raceway surface extending along a length direction of the slider and a second raceway surface facing the first raceway surface and extending along the length direction of the slider. The second raceway surface includes a first portion including a center portion in a length direction of the casing, and a second portion including end portions in the length direction of the casing and having a wall surface shape different from a wall surface shape of the first portion. In the first portion, the first raceway surface and the second raceway surface define a symmetric Gothic arch groove. In the second portion, the second raceway surface has a surface recessed from a position symmetric to the first raceway surface.

Advantages of Invention

The linear motion guide unit described above can suppress occurrence of failures in sliding irrespective of installation modes of the linear motion guide unit.

DESCRIPTION OF EMBODIMENTS

Summary of Embodiment

Figure 1:
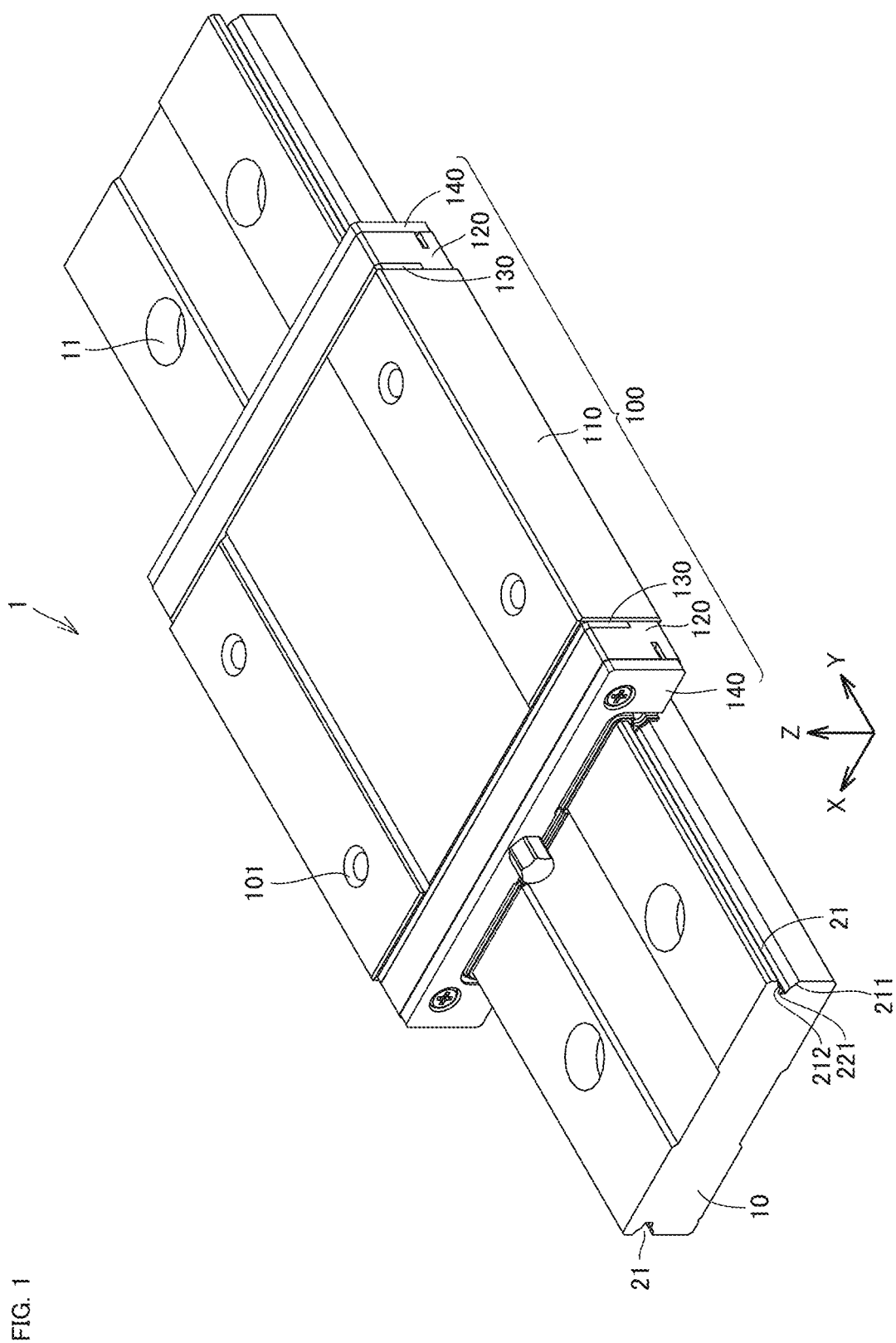
FIG. 1 is a perspective view illustrating a configuration of a linear motion guide unit in a first embodiment.

First, an embodiment of the present disclosure will be described by listing. A linear motion guide unit according to the present disclosure includes: a rail including a pair of first raceway grooves extending in parallel along a longitudinal direction; a slider straddling the rail such that the slider is movable relative to the rail, the slider including a pair of second raceway grooves respectively facing the pair of first raceway grooves; and a plurality of rolling elements, and the rail and the slider define an annular path in which the plurality of rolling elements circulate. In the linear motion guide unit, the annular path includes a raceway path defined by the first raceway groove and the second raceway groove, a first circulation path defined in the slider and extending side by side with the raceway path, and two second circulation paths defined in the slider and connecting the raceway path and the first circulation path to each other. In the linear motion guide unit, the second raceway grooves of the slider are defined in a casing of the slider. Each of the second raceway grooves includes a first raceway surface extending along a length direction of the slider and a second raceway surface facing the first raceway surface and extending along the length direction of the slider. The second raceway surface includes a first portion including a center portion in a length direction of the casing, and a second portion including end portions in the length direction of the casing and having a wall surface shape different from a wall surface shape of the first portion. In the first portion, the first raceway surface and the second raceway surface define a symmetric Gothic arch groove. In the second portion, the second raceway surface has a surface recessed from a position symmetric to the first raceway surface.

As one installation posture of the linear motion guide unit, ball circulation paths at both sides of a rail are located such that one of the paths is located above the other. This posture will be referred to as lateral installation or a lateral posture. In the case of lateral installation of a conventional linear motion guide unit, failures can occur in sliding of a slider in some cases. Such sliding failures of the slider were analyzed to find that the following phenomenon is one of causes of the failures. Specifically, in the case of lateral installation of the linear motion guide unit, raceway paths and circulation paths of rolling elements extend horizontally, whereas turnaround paths connecting the raceway paths and the circulation paths extend vertically. Thus, rolling elements that have entered the turnaround paths from the upper circulation paths fall by self weight in the turnaround paths. This falling by self weight accelerates the rolling elements. When the accelerated rolling elements enter raceway paths as load ranges, an appropriate interval between the rolling elements is lost. This is supposed to cause contention and/or clogging of the rolling elements in the raceway paths, leading to failures in sliding of the slider.

In view of this, suppression of contention of rolling elements in raceway paths was studied. Then, it was conceived that a travel adjusting portion for adjusting rolling of rolling elements is provided at a position at which the rolling elements enter raceway paths from a turnaround path so that a speed difference occurs between rolling elements rolling on the travel adjusting portion and rolling elements rolling on the raceway paths. As a result of investigation, it was devised that the rolling elements and the raceway are in contact at two points (hereinafter also referred to as a circular contact) in the travel adjusting portion, whereas the rolling elements and the raceway are in contact at four points (hereinafter also referred to as a gothic contact) in the other raceway portion. As a specific configuration, it was found that in Gothic arch grooves formed on a casing of a slider, Gothic arches have vertically symmetric upper and lower raceway surfaces in a center portion of the casing, whereas in end portions of the casing, one of the upper and lower raceway surfaces is subjected to a removal process to be recessed from the other. retard In a linear motion guide unit according to the present disclosure, in an end portion of a raceway path, a portion of the raceway surface serves as a flank on which rolling elements roll while being in circular contact with the raceway surface. On the other hand, in the portion other than the end portion of the raceway path, the rolling elements roll while being in gothic contact with the raceway surface. A rolling speed of rolling elements in the gothic contact portion is faster than a rolling speed in the circular contact portion. Thus, an appropriate interval is obtained between rolling elements rolling on the end portion of the raceway path and the preceding rolling elements, resulting in prevention or reduction of collision and contention of the rolling elements.

The linear motion guide unit according to the present disclosure hardly causes sliding failures even in lateral installation of the linear motion guide unit irrespective of an installation orientation of the linear motion guide unit to thereby achieve smooth operation of the linear motion guide unit. In addition, the linear motion guide unit according to the present disclosure can be fabricated by a simple method of removing a portion of a raceway groove formed on the casing. Thus, the linear motion guide unit with stable quality can be obtained at reasonable cost without a complicated technique.

In the linear motion guide unit, the first raceway surface may have a uniform shape over the length direction of the casing. This configuration is obtained by processing only one of the two upper and lower raceway surfaces in the casing. Accordingly, a linear motion guide unit with sliding stability and small quality variations can be obtained at reasonable cost.

In the linear motion guide unit described above, the first raceway surface and the second raceway surface in the second portion may be respectively recessed from the first raceway surface and the second raceway surface in the first portion. A second portion (end portion) is recessed in both the upper and lower raceway surfaces from the first portion (center portion), and in the second portion, the second raceway surface is recessed from the first raceway surface so that the effect of circular contact of the rolling elements in the second portion can be thereby enhanced.

In the linear motion guide unit, the second portion may be a region of 3 mm to 6 mm from an end of the casing. This configuration can obtain the advantage of high sliding stability and achieve a sufficient load region in which rolling elements roll while being in gothic contact with the raceway path, thereby obtaining high stability in rolling of the linear motion guide unit.

In the linear motion guide unit, in the first portion, a contact angle $\theta_1$ between the rolling elements and the third raceway surface and the fourth raceway surface defining the first raceway groove may be larger than a contact angle $\theta_2$ between the rolling elements and the first raceway surface and the second raceway surface defining the second raceway groove. That is, $\theta_1 > \theta_2$. This configuration ensures a speed difference between rolling elements rolling in the second portion and rolling elements rolling in the first portion. This ensures occurrence of an interval between rolling elements that are rolling, and the effect of suppressing sliding failures due to, for example, contention of rolling elements is enhanced.

In the linear motion guide unit, the contact angle $\theta_1$ is larger than the contact angle $\theta_2$ by 2° to 10°. This configuration adjusts rolling of the rolling elements to keep an interval between the rolling elements, and does not hinder traveling of the rolling elements.

SPECIFIC EXAMPLES OF EMBODIMENTS

Next, an example of a specific embodiment of a linear motion guide unit according to the present disclosure will be described with reference to the drawings. In the following drawings, the same or corresponding parts are denoted by the same reference numerals, and the description thereof will not be repeated. For easy understanding, some configurations may be deformed in the drawings. The drawings do not necessarily reflect actual dimensions.

First Embodiment

Figure 2:
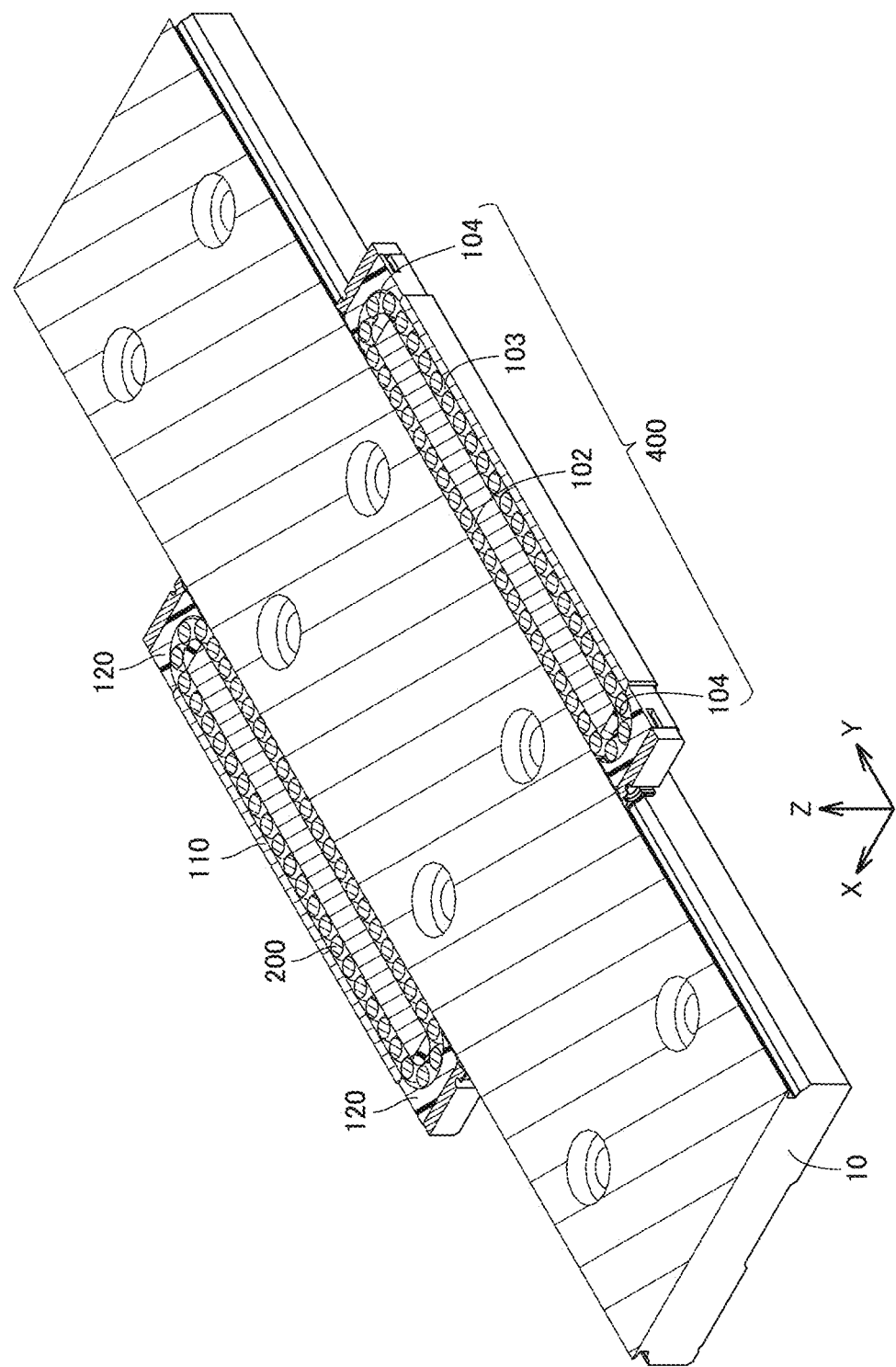
FIG. 2 is a cross-sectional view illustrating the configuration of the linear motion guide unit in the first embodiment.

FIG. 1 is a perspective view illustrating a configuration of a linear motion guide unit 1 in one embodiment of the present disclosure. In FIG. 1, the X axis is a width direction of the linear motion guide unit 1, the Y-axis direction is a length direction of the linear motion guide unit 1 (rail 10), and the Z axis is a thickness direction of the linear motion guide unit 1. FIG. 2 is a cross-sectional view illustrating a state where the linear motion guide unit 1 of FIG. 1 is cut along a plane orthogonal to the Z axis.

With reference to FIGS. 1 and 2, the linear motion guide unit 1 includes the rail 10, a slider 100, and a plurality of rolling elements 200 that are balls. The linear motion guide unit 1 includes an annular path 400 in which the rolling elements 200 circulate endlessly. The annular path 400 includes a raceway path 102 formed by the rail 10 and the slider 100 that are opposed to each other, a circulation path 103 extending side by side with the raceway path 102 and serving as a first circulation path formed in the slider 100, and two turnaround paths 104 as second circulation paths. Although specific dimensions are not limited, the annular path has a length of, for example, about 100 mm in the first embodiment. Each of the rolling elements 200 has a diameter of 3 mm, and 32 rolling elements 200 are enclosed in the annular path. The length of the annular path and the size and number of the balls are not limited to the examples described above. For example, the annular path can be about 20 to 1000 mm, and about 10 to 60 balls (rolling elements) each having a diameter of about 0.4 to 13 mm can be used.

With reference to FIG. 1, the rail 10 has attachment holes 11 for fixing a mating member to which the linear motion guide unit 1 is attached. In the rail 10, a pair of first raceway grooves 21 is formed on both side surfaces in the length direction. The first raceway grooves 21 are recessed grooves formed along the length direction of the rail 10. The recess shape of the first raceway grooves 21 is uniform over the entire length of the rail 10. That is, the shape and angle of the side walls constituting the first raceway grooves 21 and the depth of the grooves are uniform over the entire length of the first raceway grooves 21. Each of the first raceway grooves 21 includes an upper raceway surface 212 as a third raceway surface and a lower raceway surface 211 as a fourth raceway surface. In each of the lower raceway surface 211 and the upper raceway surface 212, a cross-sectional shape of a wall surface in a cross section perpendicular to the length direction is a curve defining as a portion of an arc. The wall surface shapes of the lower raceway surface 211 and the upper raceway surface 212 are determined in consideration of contact angles with the rolling elements 200. In the first embodiment, a contact angle $\theta_1$ (FIG. 10) between the rolling elements 200 and each of the lower raceway surface 211 and the upper raceway surface 212 is set at 52°. A retention band grooves 221 for housing a retention band 150 (FIG. 8) is provided between the lower raceway surface 211 and the upper raceway surface 212.

The slider 100 straddles the rail 10. The rail 10 and the slider 100 are slidable to each other. The slider 100 is constituted by an upper portion and sleeve portions hanging from both sides of the upper portion. The upper portion of the slider 100 has a plurality of holes 101 that are attachment screw holes to which a mating member such as a workpiece or equipment is to be attached.

With reference to FIG. 2, in the slider 100, the circulation path 103 and the two turnaround paths 104 individually continuous with the ends of the circulation path 103 are formed. In a casing 110 of the slider 100, second raceway grooves 22 (FIG. 4) are formed on surfaces facing the rail 10. Each of the first raceway grooves 21 of the rail 10 and the corresponding one of the second raceway grooves 22 of the slider 100 face each other, and the raceway path 102 is formed between these grooves. Each of the raceway path 102 and the circulation path 103 is a tubular path along the length direction of the rail 10. The turnaround paths 104 are arc tubular paths. The turnaround paths 104 couple the raceway path 102 and the circulation path 103 to each other. The raceway path 102, the circulation path 103, and the turnaround paths 104 coupling the raceway path 102 and the circulation path 103 form the endless annular path 400. The linear motion guide unit 1 is an endless circulation linear motion guide unit in which the rolling elements 200 enclosed in the annular path endlessly circulate in the annular path. In movement of the slider 100 on the rail 10, the rolling elements 200 roll to thereby cause the slider 100 to slide on the rail 10.

Figure 3:
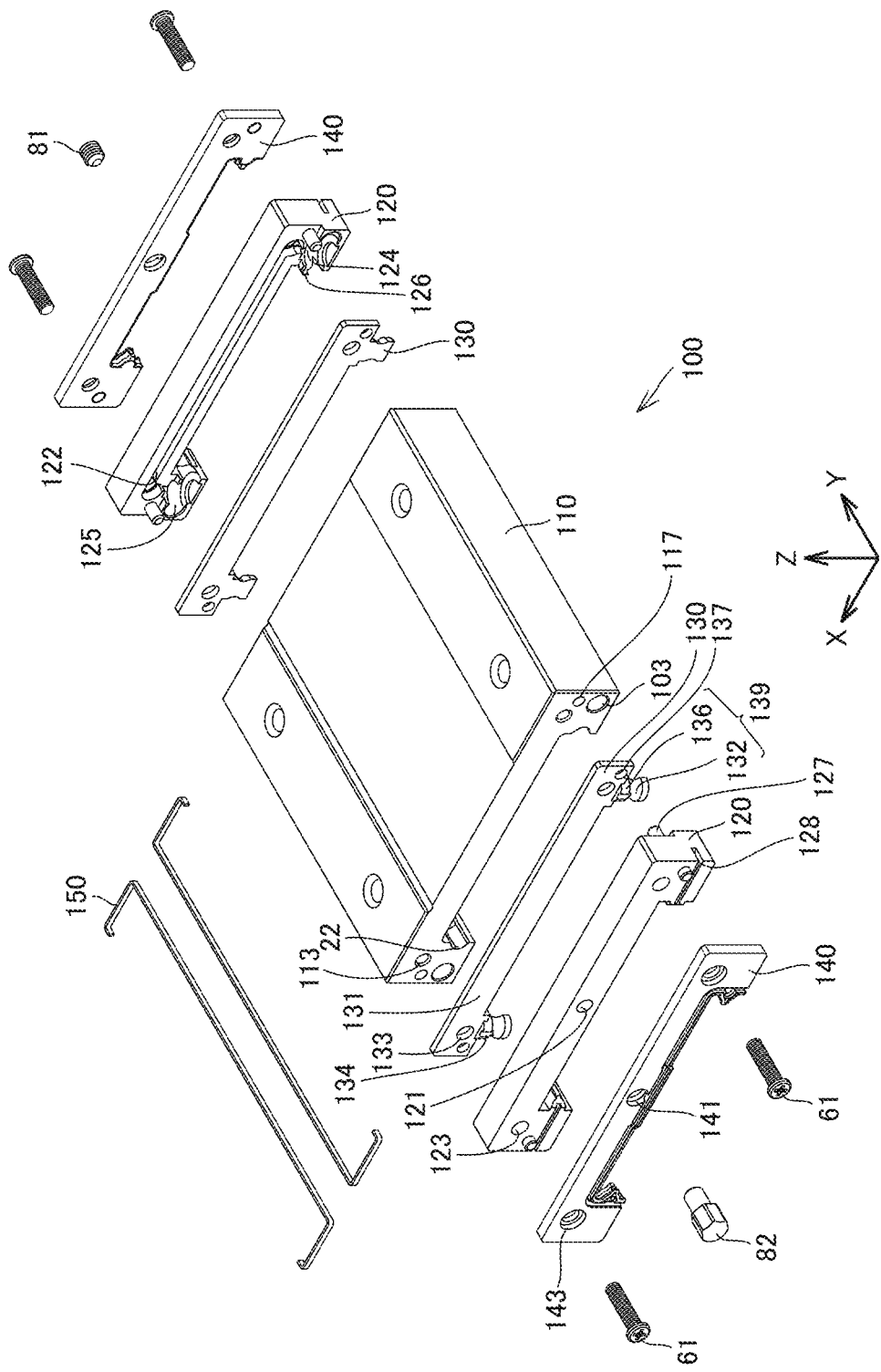
FIG. 3 is a disassembled perspective view illustrating a configuration of a slider in the first embodiment.

FIG. 3 is a disassembled perspective view illustrating a configuration of the slider 100 and its related parts. With reference to FIG. 3, the slider 100 includes the casing 110, end caps 120 attached to end surfaces of the casing 110 in the length direction, spacers 130 inserted between the casing 110 and the end caps 120, and end seals 140 attached to outer end surfaces of the end caps 120. Fixing bolts 61 are inserted through through holes 143 in the end seals 140, through holes 123 in the end caps 120, and through holes 133 in the spacers to be inserted in screw holes 113 of the casing 110 so that the casing 110, the spacers 130, the end caps 120, and the end seals 140 are thereby fixed to one another.

Each of the end caps 120 includes an outer peripheral wall 125 that is an outer peripheral wall surface of the turnaround path 104. The outer peripheral wall 125 faces an inner peripheral wall 132 of the spacer 130 to form the turnaround path 104. An upper portion of the outer peripheral wall 125 has a recess 124 for positioning. The recess 124 is engaged with a projection 136 of the spacer 130. When the recess 124 and the projection 136 of the spacer 130 are combined and the end cap 120 and the spacer 130 are brought into close contact with each other, the turnaround path 104 that is an arc path is obtained. Each outer peripheral wall 125 includes a rake claw 126 located at an inner end (end continuous with the raceway path 102) and projecting in a direction along the raceway path 102. The rake claws 126 match the first raceway grooves 21 (FIG. 1) of the rail 10.

Each of the end caps 120 has a protrusion 127 located on a surface facing the spacer 130 and protruding toward the spacer 130. The protrusions 127 penetrate the through holes 137 in the spacers 130 to be engaged with holes 117 in the casing 110 so that positioning of the end caps 120, the spacers 130, and the casing 110 can be easily performed.

Each of the end caps 120 has a retention band groove 128 located on a surface facing the end seal 140 and to be engaged with the retention band 150. The retention band 150 is a band for retaining the rolling elements 200 in order to prevent falling of the rolling elements 200 when the slider 100 is detached from the rail 10.

Each of the end caps 120 has an oil hole 121 and an oil groove 122 communicating with the oil hole 121. A lubricant injected from a grease injection port 141 of the end seal 140 can pass through the oil hole 121 and the oil groove 122 of the end cap 120 to be supplied to the annular path 400 through the oil groove 134 of the spacer 130. The grease injection port 141 is sealed with a stop cock 81 or a grease nipple 82.

Each spacer 130 is generally constituted by a spacer plate 131 extending over the width direction of the slider 100 and legs 139 located below the spacer plate 131 and constituting a portion of the annular path. Each leg 139 of the spacer 130 includes the inner peripheral wall 132 that is the inner peripheral wall surface of the turnaround path 104. The projection 136 is formed on an upper portion of the inner peripheral wall 132. The projection 136 is shaped in conformity with the recess 124 of the end cap 120. The projection 136 eases positioning in combining the spacer 130 and the end cap 120. The oil groove 134 is provided at the center of the projection 136.

Figure 4:
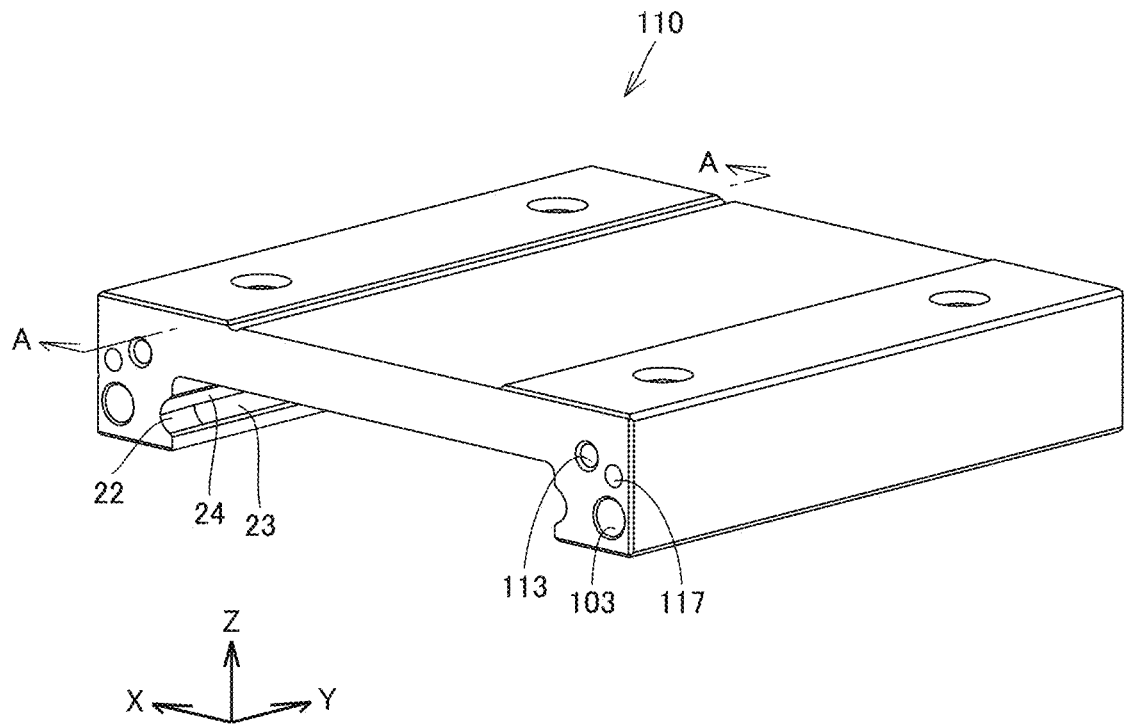
FIG. 4 is a perspective view illustrating a casing of the slider in the first embodiment.
Figure 5:
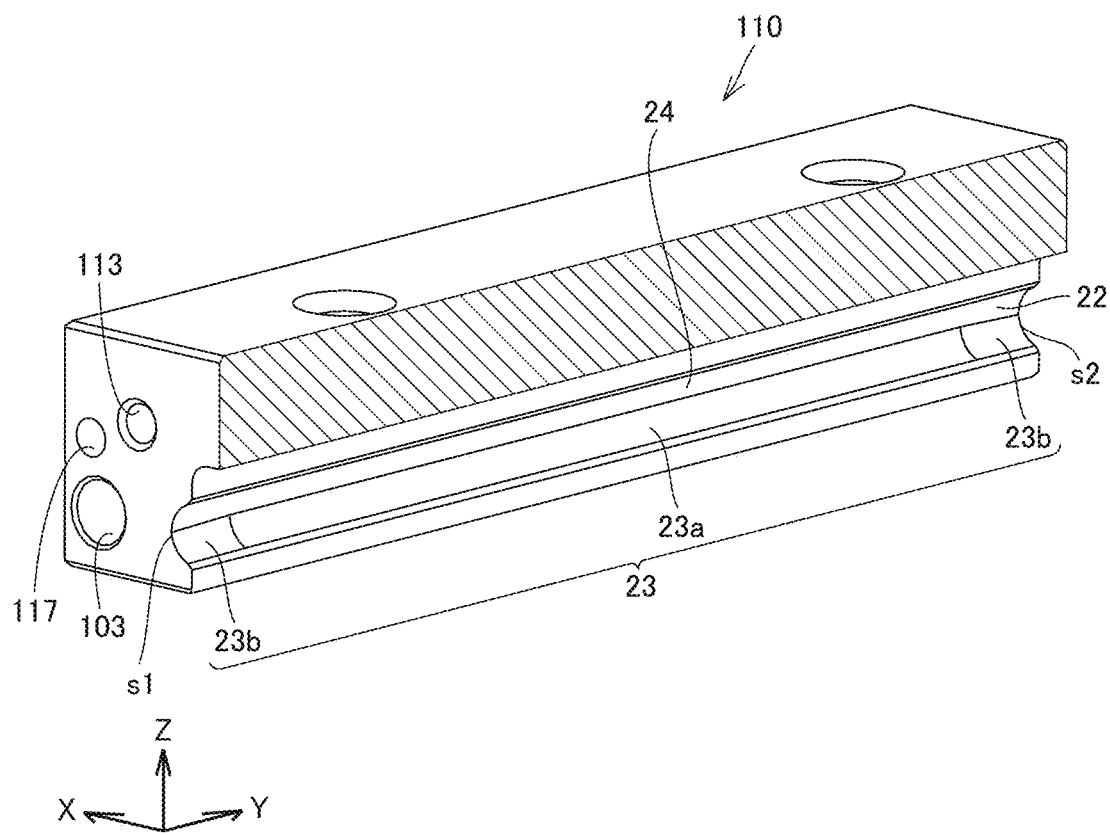
FIG. 5 is a cross-sectional view taken along line A-A in FIG. 4.
Figure 6:
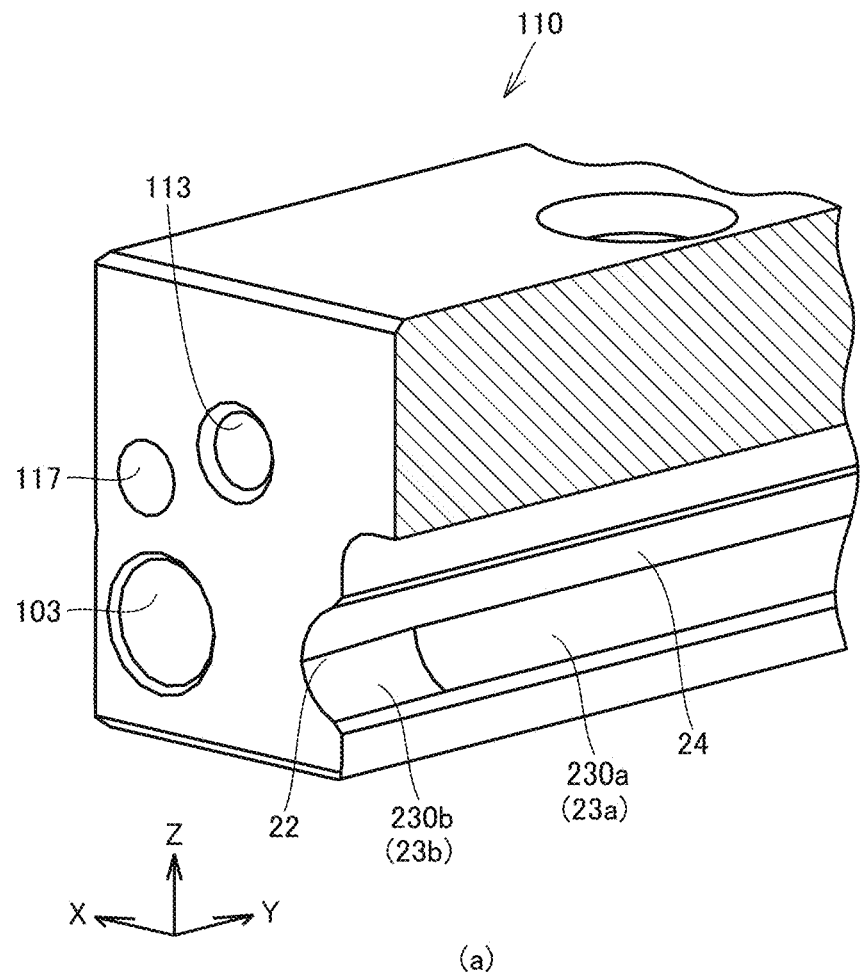
FIG. 6 shows an enlarged view of a portion of FIG. 5 and enlarged schematic views partially illustrating cross sections of the portion.
Figure 6:
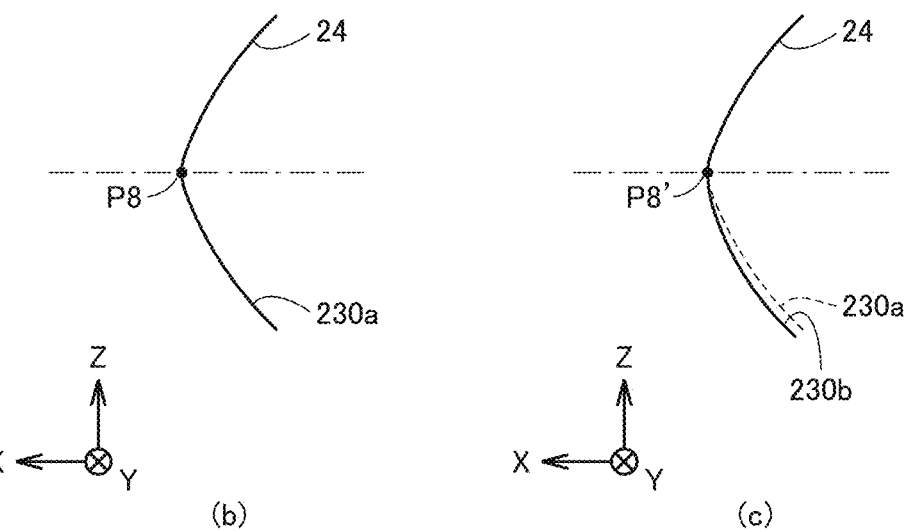

FIG. 4 is a perspective view of the casing 110. FIG. 5 is a cross-sectional perspective view of the casing 110 taken along line A-A in FIG. 4. FIG. 6 is a partially enlarged view of FIG. 5. With reference to FIGS. 5 and 6, the second raceway groove 22 is formed along the length direction on the inner side of the sleeve portion of the casing 110. The second raceway groove 22 is constituted by two surfaces: a lower raceway surface 23 as a second raceway surface and an upper raceway surface 24 as a first raceway surface. In each of the lower raceway surface 23 and the upper raceway surface 24, a cross-sectional shape of a wall surface in a cross section perpendicular to the length direction (Y-axis direction) is a curve defining a portion of an arc. The lower raceway surface 23 and the upper raceway surface 24 form a Gothic arch groove in combination.

The shape of the upper raceway surface 24 is uniform over the length direction. That is, the wall surface defining the upper raceway surface 24 has a uniform curvature and a uniform width from a first end s1 that is one end of the casing 110 to a second end s2 that is the other end of the casing 110.

On the other hand, the lower raceway surface 23 includes a center portion 23a as a first portion including a center portion of the casing 110 in the length direction, and two end portions 23b as second portions including end portions in the length direction. The lower raceway surface 23 in the center portion 23a and the lower raceway surface 23 in the end portions 23b have different wall surface shapes.

FIG. 6(b) schematically illustrates a cross section of the second raceway groove 22 perpendicular to the length direction in the center portion 23a. With reference to FIGS. 6(a) and 6(b), the cross-sectional shape of the wall surface 230a defining the center portion 23a of the lower raceway surface 23 in a cross section perpendicular to the length direction has the same curvature and width as those of the wall surface defining the upper raceway surface 24. That is, in the center portion 23a, the upper raceway surface 24 and the wall surface 230a constitute a Gothic arch groove whose vertex is at a point P8. In the center portion 23a, the second raceway groove 22 is a Gothic arch groove constituted by the upper raceway surface 24 and the wall surface 230a that are symmetric with respect to an XY plane (indicated by the alternate long and short dash line) passing through the point P8.

FIG. 6(c) schematically illustrates a cross section of the second raceway groove 22 perpendicular to the length direction in the end portion 23b. The wall surface 230b defining the end portion 23b is a wall surface formed by performing a removal process on the wall surface 230a. The wall surface 230b is recessed from the wall surface 230a. A cross-sectional shape of the wall surface 230b in a cross section perpendicular to the length direction is a curve defining a portion of an arc. In each end portion 23b, the upper raceway surface 24 and the wall surface 230b constitute a Gothic arch groove whose vertex is at a point P8'. In each end portion 23b, the second raceway groove 22 is a Gothic arch groove constituted by the raceway surface 24 and the wall surface 230b recessed from a position symmetric to the upper raceway surface 24 with respect to an XY plane (indicated by the alternate long and short dash line) passing through the point P8'.

A dimension of the end portion 23b in the length direction of the casing 110 can be appropriately set in accordance with the total size and desired characteristics of the linear motion guide unit and can be, for example, 3 mm to 6 mm. A removed portion of several millimeters formed at each end of the casing 110 can effectively prevent or reduce occurrence of contention and collision of rolling elements. The end portions 23b can be subjected to a removal process to a depth of about 3 to 5 μm from the center portion 23a. That is, the wall surface 230b can be recessed from the wall surface 230a by about 3 to 5 μm.

Variations

Figure 7:
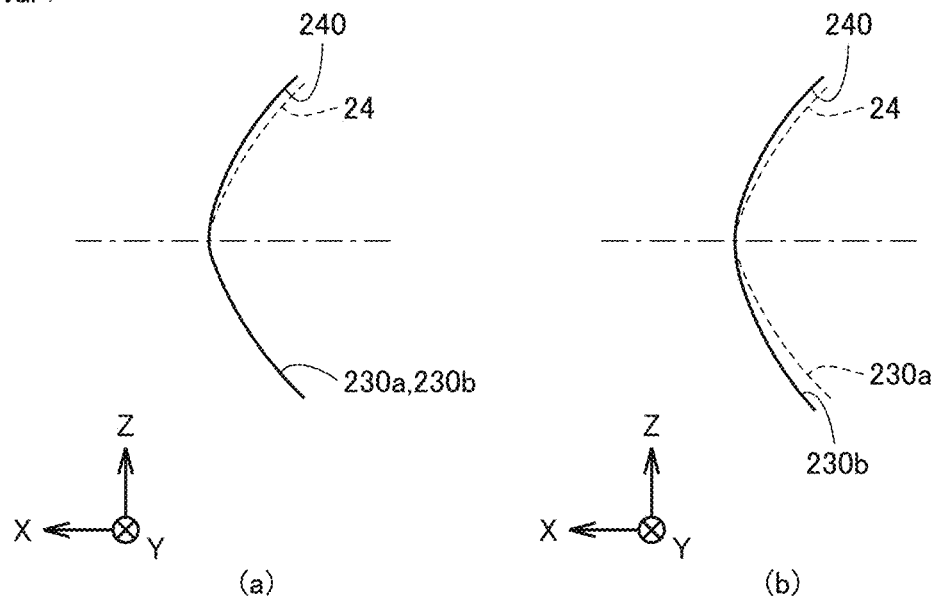
FIG. 7 shows schematic views illustrating variations of a shape of an end portion of a casing of a slider according to the present disclosure.

In the first embodiment, the shape of the upper raceway surface 24 is uniform over the length direction, and the shape of the lower raceway surface 23 is different between the center portion 23a and the end portions 23b. The present disclosure is, however, not limited to this example. FIG. 7 shows variations. With reference to FIG. 7(a), the shape of the lower raceway surface 23 (the wall surface 230a and the wall surface 230b) may be uniform over the length direction with the shape of the upper raceway surface 24 being different between the center portion 23a and the end portions 23b. In this case, the upper raceway surface 240 in the end portions 23b is recessed from the surface of the upper raceway surface 24 in the center portion 23a. With reference to FIG. 7(b), in the end portions 23b, both the lower raceway surface 23 and the upper raceway surface 24 may be subjected to a removal process to make the lower raceway surface 23 and the upper raceway surface 24 recessed from those in the center portion 23a with one of the lower raceway surface 23 or the upper raceway surface 24 being recessed from the other. In the example illustrated in in FIG. 7(b), the wall surface 230b is subjected to the removal process more deeply than the upper raceway surface 240 to be a recessed surface.

Figure 8:
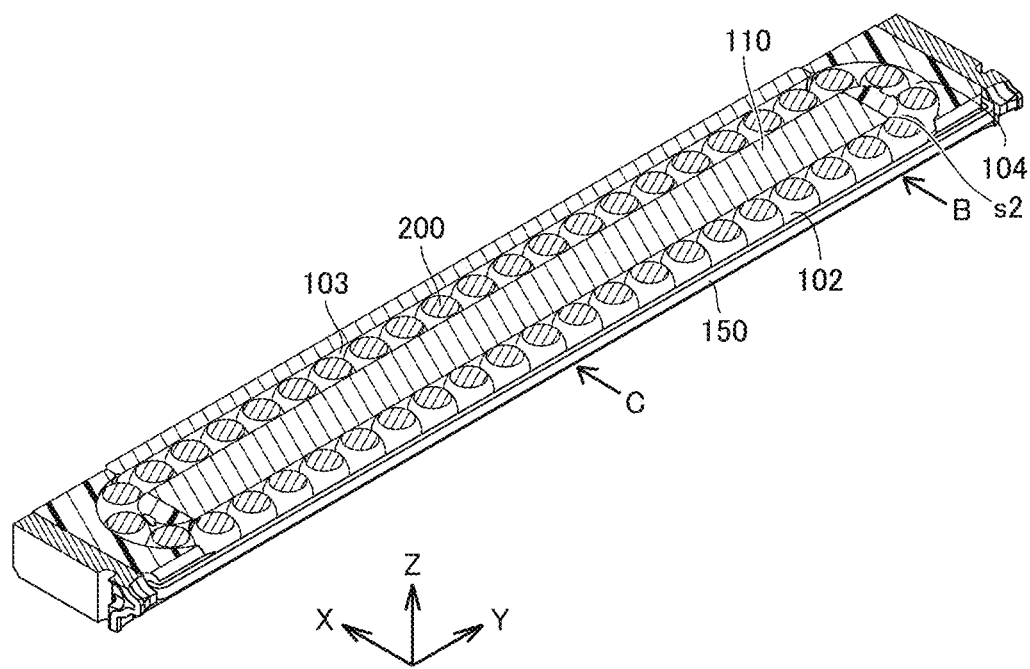
FIG. 8 is a partially enlarged view of FIG. 3 except for a configuration of a portion.

FIG. 8 illustrates a cross section of one sleeve portion of the slider 100, the rolling elements 200, and related parts taken from the linear motion guide unit 1. A state in which the X-axis direction in FIG. 8 is oriented vertically is a lateral installation posture of a linear motion guide unit. When the linear motion guide unit is installed in the lateral installation posture and the slider 100 moves in a positive direction along the Y axis relative to the rail, the rolling elements 200 orbit clockwise (clockwise when the cross section in FIG. 8 is seen from the front) in the annular path. At this time, in the turnaround path 104 connected to the second end s2 of the casing 110, the rolling elements 200 that has entered the turnaround path 104 from the circulation path 103 fall freely. The rolling elements 200 accelerated by free fall enter the raceway path 102.

Figure 9:
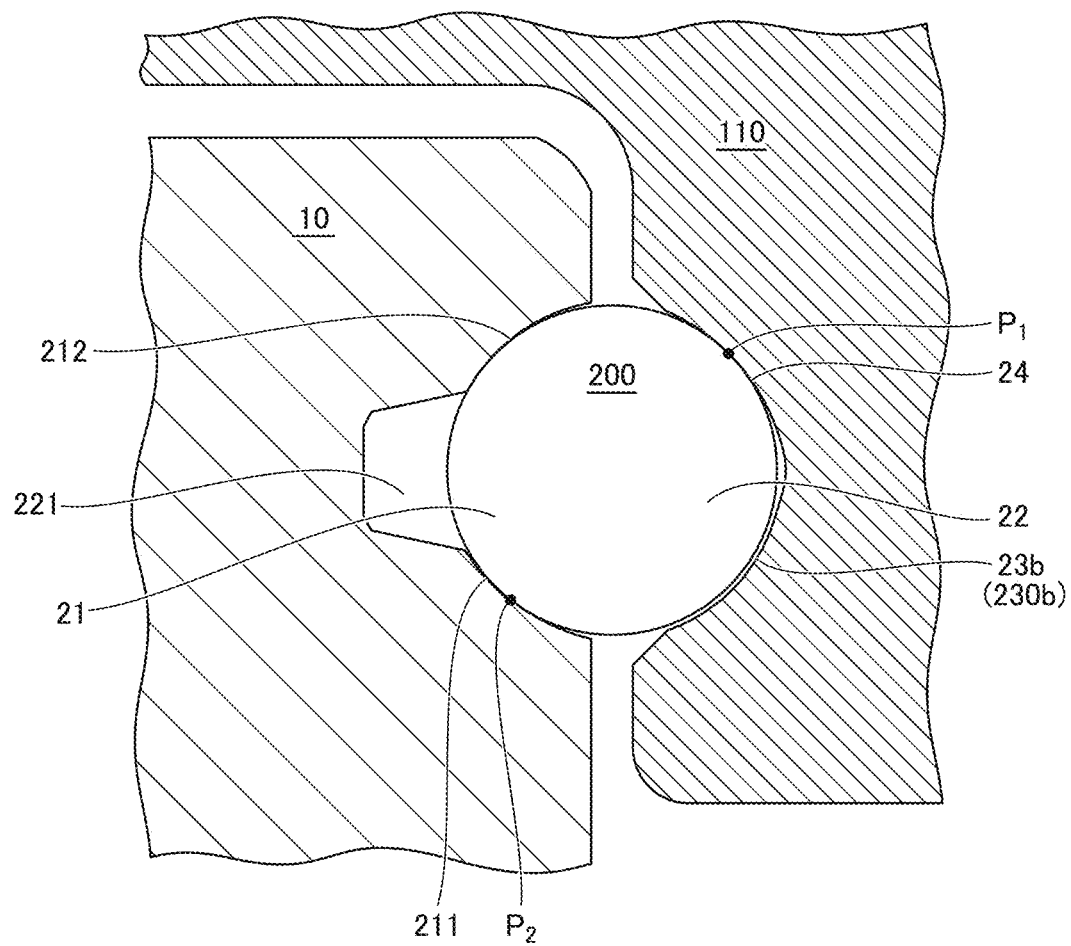
FIG. 9 is a cross-sectional schematic view of an end portion of the casing in the first embodiment.

FIG. 9 schematically illustrates the rail 10, the rolling element 200, and the casing 110 at a position corresponding to arrow B in FIG. 8, that is, in the end portion 23b. With reference to FIG. 9, the first raceway groove 21 of the rail 10 includes the upper raceway surface 212 as the third raceway surface and the lower raceway surface 211 as the fourth raceway surface. In each of the lower raceway surface 211 and the upper raceway surface 212, a cross-sectional shape of a wall surface in a cross section perpendicular to the length direction is a curve defining a portion of an arc. The lower raceway surface 211 and the upper raceway surface 212 are symmetric. The retention band groove 221 for housing the retention band 150 (FIG. 8) is provided between the lower raceway surface 211 and the upper raceway surface 212.

With reference to FIG. 9, the first raceway groove 21 provided on the rail 10 and the second raceway groove 22 of the casing 110 are opposed to each other. The rolling element 200 is in circular contact with the rail 10 and the casing 110 to take a balance of force. Specifically, the rail 10 and the rolling element 200 are in contact with each other at a point P2 on the lower raceway surface 211 of the rail 10, and the casing 110 and the rolling element 200 are in contact with each other at a point P1 on the upper raceway surface 24 of the casing 110.

Figure 10:
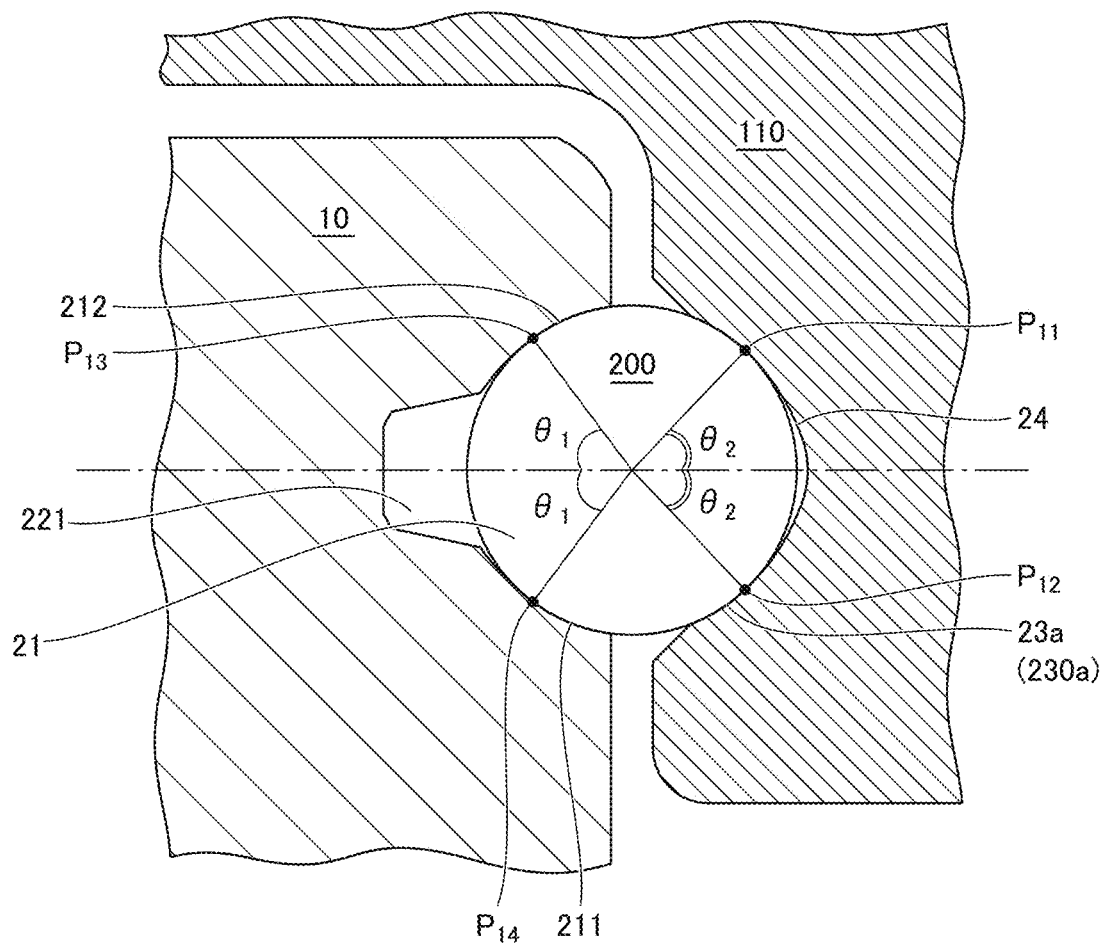
FIG. 10 is a schematic cross-sectional view of a center portion of the casing in the first embodiment.

FIG. 10 schematically illustrates the rail 10, the rolling element 200, and the casing 110 at a position corresponding to arrow C in FIG. 8, that is, in the center portion 23a. The shape of the first raceway groove 21 of the rail 10 is uniform over the length direction of the rail 10. Thus, the shapes of the lower raceway surface 211 and the upper raceway surface 212 of the rail 10 are the same as those shown in FIG. 9. On the other hand, the wall surface 230a of the casing 110 and the upper raceway surface 24 have symmetric shapes. Accordingly, the rolling element 200 is in gothic contact with the rail and the casing 110. Specifically, the rail 10 and the rolling element 200 are in contact with each other at a point P14 on the lower raceway surface 211 and a point P13 on the upper raceway surface 212. The casing 110 and the rolling element 200 are in contact with each other at a point P11 on the upper raceway surface 24 and a point P12 on the wall surface 230a.

A contact angle $\theta_1$ between the rail 10 and the rolling element 200 can be appropriately selected, and is, for example, 52° in the first embodiment. A contact angle $\theta_2$ between the casing 110 and the rolling element 200 can be appropriately selected, and is, for example, 48° in the first embodiment. The contact angle $\theta_1$ is preferably larger than the contact angle $\theta_2$. The configuration in which the contact angle $\theta_1$ is larger than the contact angle $\theta$ can increase an orbital speed of the rolling element 200.

With reference to FIGS. 8, 9, and 10, the rolling element 200 that has entered the raceway path 102 from the turnaround path 104 first rolls on the end portion 23b of the raceway path 102. On the end portion 23b, the rolling element 200 rolls while being in circular contact. Subsequently, when the rolling element 200 enters the center portion 23a, the rolling element 200 rolls while being in gothic contact. The orbital speed of the rolling element rolling in gothic contact is relatively higher than that in the case of circular contact. In addition, in the center portion 23a, the contact angle $\theta_1$ is larger than the contact angle $\theta_2$ so that the orbital speed of the rolling element 200 thereby further increases. These configurations cause a speed difference between rolling elements 200 rolling on the end portion 23b of the raceway path 102 and the preceding rolling elements 200. Accordingly, an interval occurs between the rolling elements 200 to thereby prevent or reduce collision and contention of the rolling elements.

The raceway grooves (second raceway grooves 22) of the casing in the linear motion guide unit according to the present disclosure can be formed by forming raceway grooves on the casing with a conventional method such as cutting and then performs a removal process on both ends thereof. At the ends of the casing, only one of the upper and lower raceway surfaces may be subjected to the removal process. Both of the upper and lower raceway surfaces may be subjected to the removal process such that one of the upper and lower raceway surfaces is removed more deeply than the other. The linear motion guide unit according to the present disclosure can have two features: formation of the circular contact portion by performing a removal process on a portion of the casing; and setting the contact angle on the rail side larger than the contact angle on the slider side in the gothic contact portion. The linear motion guide unit according to the present disclosure has stability in sliding irrespective of an installation posture of the linear motion guide unit without a complicated processing method.

EXAMPLES

The linear motion guide unit shown as the first embodiment was fabricated and operated in a lateral installation. In this linear motion guide unit, while the slider was moved at 2 mm/s, rolling elements were in circular contact in an end portion of the casing, and thus, the orbital speed of the rolling elements was 1 mm/s. Since the rolling elements were in gothic contact in the center portion of the casing and there is a difference between a contact angle (52°) on the rail side and a contact angle (48°) on the casing side, the orbital speed of the rolling elements was 1.04 mm/s. In this manner, it was confirmed that a difference in orbital speed of rolling elements occurred between the end portion and the center portion of the casing to cause a gap between the rolling elements.

It should be understood that the embodiments disclosed here are illustrative and non-restrictive in every respect. The scope of the present invention is defined by the terms of the claims, rather than the description above, and is intended to include any modifications within the scope and meaning equivalent to the terms of the claims.

DESCRIPTION OF THE REFERENCE NUMERALS 1 linear motion guide unit, 10 rail, 21 first raceway groove, 22 second raceway groove, 100 slider, 101 screw hole, 102 raceway path, 103 circulation path, 104 turnaround path, 110 casing, 120 end cap, 121 oil hole, 122 oil groove, 123 through hole, 124 recess, 125 outer peripheral wall, 126 rake claw, 127 projection, 128 retention band groove, 130 spacer, 131 spacer plate, 132 inner peripheral wall, 136 projection, 139 leg 140 end seal, 150 retention band, 200 ball.

The invention claimed is:

1. A linear motion guide unit comprising:
a rail including a pair of first raceway grooves extending in parallel along a longitudinal direction;
a slider straddling the rail such that the slider is movable relative to the rail, the slider including a pair of second raceway grooves respectively facing the pair of first raceway grooves; and
a plurality of rolling elements,
the rail and the slider defining an annular path in which the plurality of rolling elements circulate,
the annular path including
a raceway path defined by the first raceway groove and the second raceway groove, a first circulation path defined in the slider and extending side by side with the raceway path, and
two second circulation paths defined in the slider and connecting the raceway path and the first circulation path to each other,
in the linear motion guide unit, the second raceway grooves of the slider being defined in a casing of the slider, and
each of the second raceway grooves including a first raceway surface extending along a length direction of the slider and a second raceway surface facing the first raceway surface and extending along the length direction of the slider,
the second raceway surface including
a first portion including a center portion in a length direction of the casing, and
a second portion including end portions in the length direction of the casing and having a wall surface shape different from a wall surface shape of the first portion,
in the first portion, the first raceway surface and the second raceway surface defining a symmetric Gothic arch groove,
in the second portion, the second raceway surface having a surface recessed from a position symmetric to the first raceway surface, and
the first raceway surface is uniform over the length direction of the casing.

2. The linear motion guide unit according to claim 1, wherein
the first raceway surface and the second raceway surface in the second portion are respectively recessed from the first raceway surface and the second raceway surface in the first portion.

3. The linear motion guide unit according to claim 1, wherein the second portion is a region of 3 mm to 6 mm from an end of the casing.

4. The linear motion guide unit according to claim 1, wherein
in the first portion, a contact angle $\theta_1$ between the rolling elements and the third raceway surface and the fourth raceway surface defining the first raceway groove is larger than a contact angle $\theta_2$ between the rolling elements and the first raceway surface and the second raceway surface defining the second raceway groove.

5. The linear motion guide unit according to claim 4, wherein the contact angle $\theta_1$ is larger than the contact angle $\theta_2$ by 2° to 10°.

* * * * *